United States Patent
Liu et al.

(10) Patent No.: US 8,639,711 B2
(45) Date of Patent: Jan. 28, 2014

(54) METHOD AND SYSTEM FOR EVALUATING DATA

(75) Inventors: Haifeng Liu, Beijing (CN); Sheng Ping Liu, Beijing (CN); Jing Mei, Beijing (CN); Guo Tong Xie, Beijing (CN); Li Han Yu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 156 days.

(21) Appl. No.: 13/116,331

(22) Filed: May 26, 2011

(65) Prior Publication Data

US 2011/0295906 A1    Dec. 1, 2011

(30) Foreign Application Priority Data

May 31, 2010    (CN) .......................... 2010 1 0188587

(51) Int. Cl.
*G06F 7/00* (2006.01)
*G06F 17/30* (2006.01)
*G06F 12/00* (2006.01)

(52) U.S. Cl.
USPC .......................................... 707/760; 707/955

(58) Field of Classification Search
USPC ....................................................... 707/760
See application file for complete search history.

(56) References Cited

U.S. PATENT DOCUMENTS

2006/0136407 A1    6/2006    Dettinger et al.

FOREIGN PATENT DOCUMENTS

WO    WO-2007061430 A1    5/2007

OTHER PUBLICATIONS

L. C. Briand, J. Cui, and Y. Labiche. Towards automated support for deriving test data from UML statecharts. In Proceedings of ACM/IEEE International Conference on the Unified Modeling Language (UML'03), pp. 249-264, 2003.*
Cabot J., Teniente E.: Transformation Techniques for OCL constraints, J. of Science of Computer Programming, 68(03) Oct. 2007, p. 152-168 (2007).*
Birgit Demuth, Heinrich Hussmann, and Sten Loecher. OCL as Specification Language for Business Rules in Database Applications. In <<UML>> 2001, The Unified Modeling Language, 4th International Conference, Toronto, Canada. LNCS 2185. Springer, Oct. 2001.*
Heidenreich, F., Wende, C., Demuth, B.: A Framework for Generating Query Language Code from OCL Invariants, Proceedings of the Workshop Ocl4All: Modelling Systems with OCL at MoDELS 2007.*
Sordo M, Boxwala A, Ogunyemi O, Greenes R. Description and status update on GELLO: a proposed standardized object-oriented expression language for clinical decision support. Stud Health Technol Inform. 2004;107:164-168.*

(Continued)

*Primary Examiner* — Kannan Shanmugasundaram
(74) *Attorney, Agent, or Firm* — Scully, Scott, Murphy & Presser, P.C.; Jennifer Davis, Esq.

(57) ABSTRACT

A method and a system for evaluating data. The method comprises: receiving an Object Constraint Language (OCL) expression-based evaluation request; transforming at least part of the OCL expressions in the evaluation request into query requests; querying relevant data based on the query requests; and evaluating data obtained from the querying based on the evaluation request. The present invention may support evaluation of complex OCL expressions on a mass data set.

13 Claims, 3 Drawing Sheets

(56) References Cited

OTHER PUBLICATIONS

Akehurst et al., A Framework for Generating Query Language Code from OCL Invariants. In Proceedings of the Workshop Ocl4All: Modelling Systems with OCL co-located with the 10th International Conference on Model Driven Engineering Languages and Systems (MoDELS 2007), Oct. 2007, vol. 9, Nashville, Tennessee, ECEASST.

Ahmen Gaafar et al., Towards a Framework for Mapping Between UML/OCL and XML/XQuery. In Proceedings of the Unified Modelling Language: Modelling Languages and Applications, 7th International Conference, Oct. 11-15, 2004, pp. 241-259, Lisbon, Portugal.
Ahmed Gaafar et. al., Towards Complete Mapping Between XML/XQUERY and UML/OCL, 2004, 782-791.
http://www.eclipse.org/modeling/mdt/?project=ocl. Printed Aug. 16, 2011. (Circa 2011).
http://www.omg.org/technology/documents/modeling_spec_catalog.htm#OCL. Printed Aug. 16, 2013. (Copyright 1997-2013).

\* cited by examiner

METHOD AND SYSTEM FOR EVALUATING DATA

CROSS REFERENCE TO RELATED APPLICATION

This Invention claims priority under 35 U.S.C. 119 from Chinese Application 201010188587.5, filed May 31, 2010, the entire contents of which are incorporated herein by reference.

BACKGROUND OF THE INVENTION

1. Field of the Invention

The present invention generally relates to the field of information processing technology, and more particularly to a method for evaluating data and a system thereof.

2. Description of Related Art

Object-oriented modeling through a unified modeling language (UML) represents the mainstream of current software development. Take the medical field as an example. A global medical information standardization organization, Health Level Seven (HL7), has been dedicated to stipulating the modeling standard Reference Information Model (RIM) for medical systems. When using a standardization model, many applications need to evaluate expressions. An Object Constraint Language (OCL) is a universal UML expression language for describing constraints in an UML model. Still taking the medical field as an example, HL7 stipulates a clinical Guideline Expression Language (GELLO) for describing clinical expressions in the RIM model.

Mass data are always generated in actual application systems. These data are stored in a database according to particular schemas. Based on different types of databases, these data can be stored as relational data, Extensible Markup Language (XML) data, Resource Description Framework (RDF) data, etc. For example, in the medical field, a Clinical Document Architecture (CDA), which is a document markup standard for clinical document structure and semantics for exchanging, is stipulated by HL7. Since many national and international medical institutions conform to the HL7 standard, a great amount of CDA documents are generated in medical application systems. With a typical domestic Grade-A hospital as an example, outpatient and emergency departments generate about 20,000 CDA documents per year, which correlates to about 600 CDA documents per day on average. The inpatient departments have 2000 beds, with each bed patient generating 200 CDA documents on average; about 400,000 CDA documents in total. Thus, there are millions of CDA documents stored in a hospital information system. Moreover, since the process for evaluating data using OCL expressions is conducted in memory, a limitation in the prior art is that it would be impossible to evaluate such mass data based on the OCL expressions describing a standardized model; it would always results in memory overflow or abnormal termination of the evaluating process. Therefore, it is desirable to provide a method or system for evaluating data from a mass data set.

BRIEF SUMMARY OF THE INVENTION

To overcome these deficiencies, the present invention provides a method for evaluating data, including: receiving an Object Constraint Language (OCL) expression-based evaluation request; transforming at least part of the OCL expressions in the OCL expression-based evaluation request into query requests; querying relevant data based on the query requests; and evaluating data obtained from the querying based on the evaluation request.

According to another aspect, the present invention provides a system for evaluating data, the system including: receiving means configured to receive an Object Constraint Language (OCL) expression-based evaluation request; an analyzer configured to transform at least part of the OCL expressions in the OCL expression-based evaluation request into query requests; a data querying engine configured to query relevant data based on the query requests; and an OCL engine configured to evaluate data obtained from the querying based on the evaluation request.

According to yet another aspect, the present invention provides an article of manufacture tangibly embodying computer readable instructions which, when executed, cause a computer to carry out the steps of a method for evaluating data, the method including: a computer readable storage medium having computer readable program code embodied therewith, the computer readable program code including: computer readable program code configured to perform the steps of: receiving an Object Constraint Language (OCL) expression-based evaluation request; transforming at least part of the OCL expressions in the OCL expression-based evaluation request into query requests; querying relevant data based on the query requests; and evaluating data obtained from the querying based on the evaluation request.

BRIEF DESCRIPTION OF THE SEVERAL VIEWS OF THE DRAWINGS

In order to describe the features and advantages of the embodiments of the present invention in detail, reference will be made to the following accompanying drawings. If possible, in the accompanying drawings and description, identical or like reference signs are used to indicate identical or like parts, wherein.

DETAILED DESCRIPTION OF THE PREFERRED EMBODIMENTS

Hereinafter, a detailed description will be made with reference to the exemplary embodiments of the present invention. Examples of the embodiments are illustrated in the accompanying drawings, where identical reference numbers indicate identical elements throughout the figures. It should be understood that the present invention is not limited to the disclosed exemplary embodiments. It should be further understood that not every feature of the method and device is necessary to implement the present invention as claimed by any claim. Further, in the whole disclosure, when indicating or depicting a process or a method, the steps thereof can be performed simultaneously or in any sequence, unless it is clear from the context that implementation of a step depends on preceding implementation of another step. In addition, the time between steps can be substantial intervals.

Figure 1:
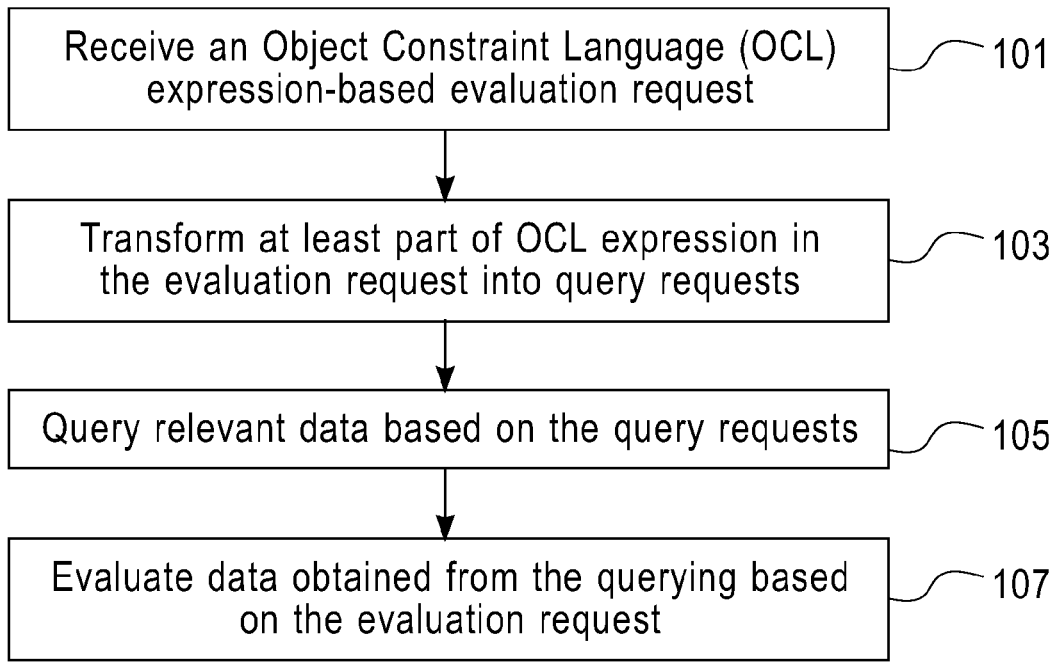
FIG. 1 illustrates a first embodiment for evaluating data according to the present invention.

FIG. 1 illustrates a first embodiment for evaluating data according to the present invention. At step 101, an Object Constraint Language (OCL) expression-based evaluation request is received. The evaluation request can be filed by a user or automatically filed by a system based on preset OCL expressions. Below is an exemplary segment of RIM model-based OCL expressions:

```
1. package RIM
2. context Organization self.name='ABC hospital'
3. def: allPatients : Set(Patient) = self.scopedRole -> select(oclIsTypeOf(Patient)).
oclAsType(Patient)
4. let: headache : CD = factory.CD('SNOMED CT', '25064002')
5. let: systolicBP_threshold : PQ = factory.PQ(140, 'mmHg')
6. let: diastolicBP_threshold : PQ = factory.PQ(90, 'mmHg')
7. allPatients -> select(veryImportantPersonCode='VIP' and
         participation.act.oclAsType(Observation) -> exists (code.imply (headache)
     and
         (outboundRelationship.target.value.greaterThan (systolicBP_threshold)
     or
         outboundRelationship.target.value.greaterThan(diastolicBP_threshold))))
```

The first expression in the above OCL expressions specifies that the model to be conformed to is the RIM model. The second expression specifies that the context is a medical institution, i.e., ABC hospital. The third expression defines that allPatients refers to all patients in the hospital. The fourth expression states that headache is a Concept Descriptor (CD), of which the definition refers to Systematized Nomenclature of Medicine—Clinical Terms (SNOMED CT), namely headache corresponding to the SNOMED CT code 25064002. The fifth and sixth expressions state respectively that systolicBP_threshold and diastolicBP_threshold are Physical Quantities (PQ); their definitions include quantitative value and its unit, namely the systolic blood pressure threshold being 140 mmHg, and the diastolic blood pressure threshold being 90 mmHg. The last expression represents selecting, from allPatients, VIP patients who have a symptom of headache, with a systolic blood pressure higher than the threshold 140 mmHg or a diastolic blood pressure threshold higher than 90 mmHg.

At step 103, OCL expressions in the evaluation request are transformed into query requests. Because of the existence of mass data, it would be rather difficult to load this mass data into a memory for evaluating directly based on the OCL expressions. As mentioned in the Background of the Invention, a typical large hospital has millions of CDA documents about patients, while the above-mentioned third expression requires considering all patient data, thus it would be infeasible to directly load millions of patient data into memory for evaluating. In other words, the above-mentioned exemplary OCL expressions would be inapplicable for evaluating data amounts of a typical large hospital. However, in the present embodiment, an improved approach is employed to transform OCL expressions into query requests, so as to leverage the search capability of a data querying engine to overcome the problem of excessive data amounts to be evaluated for OCL expressions. Hereinafter, preferred embodiments of transforming OCL expressions into query requests will be described in detail. Based on the present application, those skilled in the art may also employ various applicable transforming methods in the prior art, for example, referring to literature [1] Florian Heidenreich, Christian Wende and Birgit Demuth. A Framework for Generating Query Language Code from OCL Invariants. In Proceedings of the Workshop Ocl4All: Modelling Systems with OCL co-located with the 10th International Conference on Model Driven Engineering Languages and Systems (MoDELS 2007), Nashville, Tenn., October 2007. ECEASST, Volume 9, or literature [2] Ahmed Gaafar, Sherif Sakr. Towards a Framework for Mapping Between UML/OCL and XML/XQuery. In Proceedings of the Unified Modelling Language: Modelling Languages and Applications, 7th International Conference, Lisbon, Portugal, Oct. 11-15, 2004. UML 2004, pp. 241-259. The above-mentioned transformation may also be performed based on the processing capability characteristics or restraints of data querying engines into which the user inputs.

At step 105, relevant data are queried based on the query requests. Based on the transformed query requests, relevant data can be queried using any applicable existing data querying engines. The existing applicable data querying engines are such as XQuery engine, SQL engine, SPARQL engine, etc. A more targeted and smaller data set will be obtained by using a relevant data querying engine. For example, through a transformed query request, it can be queried out that the data set includes VIP patients, which apparently greatly narrows the data scale for subsequent processing.

Then, the flow proceeds to step 107 to evaluate the data obtained from the querying based on the evaluation request. In this step, the evaluation request based on the original OCL expressions is used to evaluate the data set obtained from the querying. Since the scale of the data set obtained from the querying has been greatly narrowed over the original data set, the OCL expressions may use a memory-based OCL engine to evaluate the data loaded into the memory with a narrowed scale, thereby accurately and quickly obtaining the information that the user desires to know. It is worthy of noting that some OCL expressions require arithmetic operations, which goes beyond the capability of a data querying engine. For example, PQ.greaterThan operation of physical quantity PQ relates to not only comparing quantitive values, but also transforming operations of quantity unit. Take blood pressure measurement as an example. The international unit is kpa, while a common unit is mmHg, where 1 kpa=7.5 mmHg. In this way, it can be known through unit transformation operation that the physical quantity PQ (20, 'kpa') is greater than the physical quantity PQ (140, 'mmHg'). Besides, an implication operation for the Concept Descriptor (CD) CD.imply involves the inference of concept subsumption. For example, the concept descriptor "migraine" implies the concept descriptor "headache"; in another example, the concept descriptor "left hypochondriac ache" implies "ache" on the "left side" of the "abdomen" region. Therefore, an OCL engine can be employed to evaluate these complex OCL expressions, where many OCL engines belong to commercialized tools, among which Eclipse MDT/OCL tool, for example, is a well known one. For example, based on the above OCL expressions, in the data set as queried out including VIP patients, it is evaluated that the patients have a symptom of headache, with a systolic blood pressure higher than the threshold 140 mmHg or a diastolic blood pressure threshold higher than 90 mmHg.

The above-mentioned first embodiment of the present invention may support the evaluation of a complex OCL expression on a mass data set. On one hand, the present invention may perform a complex OCL expression evaluation, which goes beyond the capability of typical data queries. On the other hand, the present invention can support evaluating a complex OCL expression on a mass data set, which overcomes the drawbacks of typical OCL engines. Therefore, the present invention can solve the problems that cannot be solved by the prior art.

Figure 2:
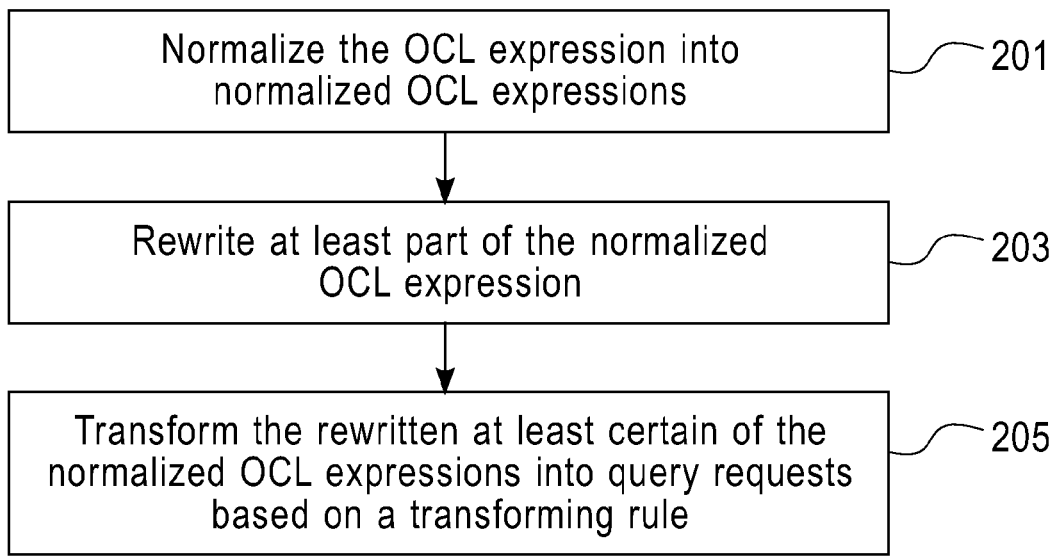
FIG. 2 illustrates a second embodiment for evaluating data according to the present invention.

FIG. 2 illustrates a second embodiment for evaluating data according to the present invention. More particularly, it illustrates an embodiment of the above-mentioned step 103. In this embodiment, at step 201, OCL expressions are normalized into normalized OCL expressions. This normalization process is made by grammatically parsing an input OCL expression based on the Backus-Naur Form (BNF) of OCL, such that the normalized OCL expressions satisfy the following two normalization requirements: first, all conditional expressions should be conjunctive normal forms. The reason is that in the subsequent procedure of rewriting the expressions, a conjunctive normal form can assign value to relevant conditional expression sub-sentences more effectively than a disjunctive normal form. Second, all operands allow no iterative definition. By introducing a temporary variant name, each operand has and can only have four possible forms: 1. temporary variant name; 2. correlated operand; 3. collection operand; 4. functional operand. The detailed specification for the Backus-Naur Form (BNF) of OCL may refer to OMG OCL specification. Below is an exemplary segment of a BNF disjunctive normal form to which an OCL expression conforms:

```
Expression ::= ConditionalExpression
ConditionalExpression ::= OrExpression
OrExpression ::= ConditionalAndExpression (<OR> ConditionalAndExpression)*
ConditionalAndExpression ::= ComparisonExpression (<AND> ComparisonExpression)*
ComparisonExpression ::= Add Expression (<EQUAL> AddExpression | <NEQ> AddExpression | <LT> AddExpression | <LEQ> AddExpression  | <GT> AddExpression | <GEQ> AddExpression)*
AddExpression ::= MultiplyExpression (<MINUS> MultiplyExpression | <PLUS> MultiplyExpression)*
MultiplyExpression ::= UnaryExpression (<TIMES> UnaryExpression | <DIVIDE> UnaryExpression | <MAX> UnaryExpression | <MIN> UnaryExpression | <INTDIV> UnaryExpression | <MOD> UnaryExpression )*
UnaryExpression ::= PrimaryExpression | <NOT> UnaryExpression | <MINUS> UnaryExpression | <PLUS> UnaryExpression
PrimaryExpression ::= Literal | Operand | ReferenceToInstance | "(" Expression ")"
ReferenceToInstance ::= <FACTORY>.ClassName(ParameterList)
Operand ::= <ID> | Operand "." <ID> | Operand "→" CollectionBody | Operand "(" ParameterList ")" | <SELF>
CollectionBody ::= NonParamExp | SingleObjExp | ListObjExp | GetExp | SetExp | IterateExp | JoinExp | SelectionExp | QuantifierExp
SelectionExp ::= <SELECT> "(" CExp ")" | <REJECT> "(" CExp ")" | <COLLECT> "(" CExp ")"
QuantifierExp ::= <FORALL> "(" CExp ")" | <EXISTS> "(" CExp ")"
CExp ::= ConditionalExpression
```

On the other hand, normalized OCL expressions satisfy the normalization requirements. Namely, normalized OCL expressions conform to the following exemplary segment of BNF conjunctive normal form. Specifically, the inputted OCL conditional expression ConditonalExpression before normalization is the disjunctive normal form OrExpression, while the outputted normalized OCL conditional expression ConditionalExpression is the conjunctive normal form AndExpression. Besides, the inputted OCL operand Operand can be defined iteratively, for example Operand::=Operand "." <ID>, while the normalized OCL operand Operand may not be iteratively defined. In actuality, by introducing a temporary variant name tempID, the to-be-normalized OCL operand Operand has and can only have four possibilities: 1. a temporary variant name tempID, 2. a correlated operand tempID "." <ID>, 3. a collection operand tempID "→" CollectionBody, and 4. a functional operand tempID "." "funcID" ("ParameterList")".

```
ConditionalExpression ::= AndExpression
AndExpression ::= ConditionalOrExpression (<AND> ConditionalOrExpression)*
ConditionalOrExpression ::= ComparisonExpression (<OR> ComparisonExpression)*
Operand ::= tempID | tempID"."<ID> |
tempID"→"CollectionBody |
tempID"."funcID "(" ParameterList ")"
tempID ::= <SELF> | <ID>
funcID ::= <oclIsTypeOf> | <oclAsType> | <imply> | <greaterThan> | <ID>
CExp ::= AndExpression
AndExpression ::= ConditionalOrExpression (<AND>)*
OrExpression ::= ConditionalAndExpression (<OR> ConditionalAndExpression)*
ConditionalAndExpression ::= ComparisonExpression (<AND> ComparisonExpression)*
```

With an initial OCL expression as an example, it will become the following individual OCL single sentences after normalization so as to facilitate subsequent processing:

```
def: temp1 : Set(Role) = self.scoped Role
def: cond11 : Boolean = temp1.oclIsTypeOf(Patient)
def: temp2 : Set(Role) = temp1 -> select(cond11)
def: temp3 : Set(Patient) = temp2.oclAsType(Patient)
def: temp31 : String = temp3.veryImportantPersonCode
def: cond31 : Boolean = temp31=='VIP'
def: temp32 : Set(Participation) = temp3.participation
def: temp33 : Set(Act) = temp32.act
```

-continued

```
def: temp34 : Set(Observation) = temp33.oclAsType(Observation)
def: temp35 : CD = temp34.code
def: cond35 : Boolean = temp35.imply(headache)
def: temp36 : Set(ActRelationship) = temp34.outboundRelationship
def: temp37 : Set(Observation) = temp36.target
def: temp38 : PQ = temp37.value
def: cond381 : Boolean  = temp38.greaterThan(systolicBP_threshold)
def: cond382 : Boolean = temp38.greaterThan(diastolicBP_threshold)
def: cond32 : Boolean = temp35 -> exists(cond35 and (cond381 or
cond382))
temp3 -> select(cond31 and cond32)
```

At step 203, the normalized OCL expressions are rewritten. This rewriting procedure mainly considers that those OCL expressions having arithmetic operations go beyond the capability of the data querying engine. For example, cond35 in the above-mentioned OCL expression involves implication operation of the concept descriptor CD, namely, whether the concept descriptor temp35 implies the concept descriptor "headache." For another example, cond381 or cond382 in the above-mentioned OCL expression involves greaterThan operation of physical quantity PQ, namely whether the physical quantity temp38 is greater than the physical quantity "systolic BP threshold," or whether the physical quantity temp38 is greater than the physical quantity "diastolic BP threshold." Here, the greaterThan operation relates to not only comparing quantity values, but also a transformation operation on quantity units. For example, through unit transforming operation, it is known that the physical quantity PQ (20, 'kpa') is greater than the physical quantity PQ (140, 'mmHg'). It can be easily found that these OCL expressions having arithmetic operations go beyond the capability of the data querying engine. Thus, after a rewriter rewrites the inputted OCL expressions, the outputted OCL expressions can be transformed into expressions that can be handled by the data querying engine. Specifically, for any OCL operand tempID1, if the definition of tempID1 involves arithmetic operations (goes beyond the capability of the data querying engine), in the form of tempID2.funcID(ParameterList), where funcID is an arithmetic operator, then the following processing approach can be employed:

1) If tempID1 is a Boolean expression, then it is rewritten into a true value TRUE. Namely, if a definition def: tempID1: Boolean=tempID2.funcID(ParameterList) exists, then it is rewritten as definition def: tempID1: Boolean=TRUE.
2) Otherwise, the definitions of tempID1 and other operands that use the definition of tempID1 are deleted, and tempID2 is used to replace all these deleted operands. Namely, the definitions (including iterative definitions) regarding tempID1, tempID1.<ID>, tempID1→CollectionBody, tempID1.funcID(ParameterList) are all deleted, and tempID2 is used to replace all these deleted operands.

For example, assume three time styles (TSs) and one physical quantity are defined as follows. First, aWeek denotes one week; second, t2 denotes the effective time of the above-mentioned temp34, while t1 is t2 plus aWeek, namely t1 means one week after t2, and finally, t0 is the time zone of t1, and return t0. Based on the definition of t1, i.e., t2.plus (aWeek), where plus is an add operation about time, which goes beyond the capability of the data querying engine, then t1 and the operand t0 that uses the definition of t1 are deleted, and t2 is returned as the result in place of t0. In this way, although the initially desired t0 value is not obtained, all the outputted OCL expressions can be transformed into expressions that can be handled by the data querying engine. Finally, the OCL engine will provide evaluations on all initial OCL expressions, thereby effectively obtaining the desired correct results.

```
let: aWeek: TS = factory.TS(1, 'week')
def: t2 : TS   = temp34.effectiveTime
def: t1 : TS   =   t2.plus(aWeek)
def: t0 : PQ = t1.timezone
t0
```

The above processing approach is an embodiment, which should not constitute a restriction to the protection scope of this application. Of course, those skilled in the art may also adopt other suitable processing approaches based on this application. After experiencing the above-mentioned rewriting step, the exemplary OCL expressions are rewritten to:

```
def: temp1 : Set(Role) = self.scopedRole
def: cond11 : Boolean = temp1.oclIsTypeOf(Patient)
def: temp2 : Set(Role) = temp1 -> select(cond11)
def: temp3 : Set(Patient) = temp2.oclAsType(Patient)
def: temp31 : String = temp3.veryImportantPersonCode
def: cond31 : Boolean = temp31=='VIP'
def: temp32 : Set(Participation) = temp3.participation
def: temp33 : Set(Act) = temp32.act
def: temp34 : Set(Observation) = temp33.oclAsType(Observation)
def: temp35 : CD = temp34.code
def: cond35 : Boolean = temp35.imply(headache)
def: temp36 : Set(ActRelationship) = temp34.outboundRelationship
def: temp37 : Set(Observation) = temp36.target
def: temp38 : PQ = temp37.value
def: cond381 : Boolean   = temp38.greaterThan(systolicBP_threshold)
def: cond382 : Boolean = temp38.greaterThan(diastolicBP_threshold)
def: cond32 : Boolean = temp35 -> exists(TRUE and (TRUE or TRUE))
temp3 -> select(cond31 and TRUE)
```

From the bottom-to-top perspective, satisfying condition cond31 must be selected from temp3 finally, thus only the definitions of temp3 and cond31 are required, while their definitions involve temp31, temp2, tempt, and cond11 in sequence. Therefore, after rewriting, only the above underlined sentences are left for the valid OCL expressions (to the data querying engine).

At step 205, based on a transforming rule, the rewritten OCL expressions are transformed into query requests. Specifically, a transforming rule needs to be prescribed based on the storage structure of to-be-evaluated data. For example, if the to-be-evaluated data are stored in an Extensible Markup Language (XML) database, then based on the mapping relationships between language correspondence elements of the OCL expressions and XQuery expressions as illustrated in Table 1, the normalized OCL expressions are transformed into XQuery expressions-based query requests. These mapping relationships are only exemplary, and those skilled in the art may also extend or improve these mapping relationships based on this application, for example, referring to the above-mentioned literatures [1], [2].

TABLE 1

| OCL | XQuery |
|---|---|
| def: tempID | let $tempID |
| tempID.ID | $tempID/ID if ID is an association |
|  | $tempID/@ID if ID is an attribute |
| tempID.oclIsTypeOf(ClassName) | $tempID[@xsi:type=ClassName] |
| tempID.oclAsType(ClassName) | $tempID |
| tempID→select(condID) | If condID then return tempID else ( ) |
| tempID→reject(condID) | If condID then ( ) else return tempID |

After transforming the above-mentioned valid OCL expressions based on the above-mentioned OCL-XQuery mapping relationships, the following XQuery expressions are obtained:

```
xquery
    for $self in db2-fn:sqlquery('select doc from RIM where
org.name=ABC hospital')/organization
        let $temp1 := $self/scopedRole
        let $temp2 := $temp1[@xsi:type='Patient']
        let $temp3 := $temp2
        let $temp31 := $temp3/@veryImportantPersonCode
        let $cond31 := $temp31 = 'VIP'
        return
            if $cond31
            then return $temp3
            else ( )
```

On the other hand, if the to-be-evaluated data are stored in a relational database, then based on the mapping relationships between language correspondence elements of the OCL expressions and SQL expressions as illustrated in Table 2, the normalized OCL expressions are transformed to Structured Query Language (SQL)-based query requests. Likewise, these mapping relationships are only exemplary, and those skilled in the art may also extend or improve these mapping relationships based on this application, for example, referring to the above-mentioned literatures [1], [2]. For the sake of conciseness, the SQL expressions obtained after transforming the above-mentioned valid OCL expressions based on the above-mentioned OCL-SQL mapping relationships are omitted. The above-mentioned XQuery and SQL expressions are only exemplary. Of course, those skilled in the art may obtain any other forms of transformation expressions based on the present application.

TABLE 2

| OCL | SQL |
| --- | --- |
| def: tempID | CREATE VIEW tempID |
| tempID.ID | SELECT ID FROM tempID |
| tempID.oclIsTypeOf(ClassName) | SELECT * FROM tempID WHERE type=ClassName |
| tempID.oclAsType(ClassName) | SELECT * FROM tempID WHERE type=ClassName |
| tempID→select(condID) | SELECT * FROM tempID WHERE condID=TRUE |
| tempID→reject(condID) | SELECT * FROM tempID WHERE condID=FALSE |

Figure 3:
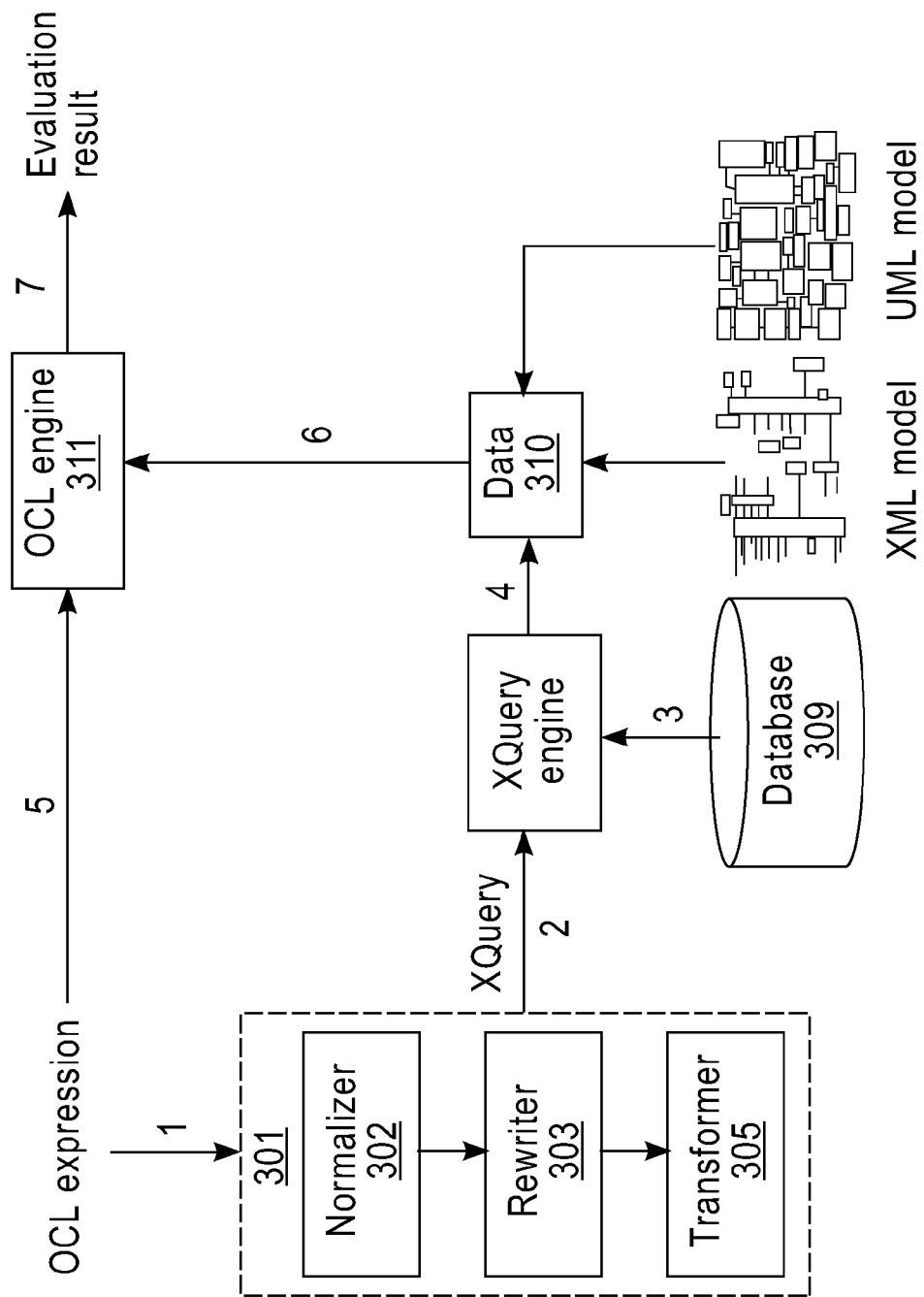
FIG. 3 illustrates a third embodiment for evaluating data according to the present invention.

FIG. 3 illustrates a third embodiment for evaluating data according to the present invention. A system 300 for evaluating data and specific operating flows are provided here. First, an OCL expression-based evaluation request is filed by the user or by the system 300 automatically based on a preset OCL expression. Then, in the step as indicated by arrow 1, OCL expressions are obtained from the evaluation request. The OCL expressions are sent to an analyzer 301, which includes a normalizer 302, a rewriter 303, and a transformer 305. After the OCL expressions are subjected to the normalizer 302, normalized OCL expressions are outputted; after the normalized OCL expressions are inputted into the rewriter 303, rewritten OCL expressions are outputted; and after the rewritten OCL expressions are inputted into the transformer 305, query expressions, for example XQuery expression-based query requests for a target database 309 are outputted. The functional implementations of the above-mentioned normalizer, rewriter, and transformer will not be detailed here, since they are similar to the previously detailed corresponding method. In the step indicated by arrow 2, the query expressions are submitted to a data querying engine (for example an XQuery engine) for searching the target database 309. Preferably, the database and the data conform to relevant specifications of the data model (i.e, UML model) and the data mode (for example, a relational data mode or XML data mode). In the steps indicated by arrows 3 and 4, the data querying engine searches out data 310 from the target database, and the data 310 can be loaded into a memory usable by the OCL engine 311 for subsequent evaluation. In the step indicated by arrow 5, the OCL expressions submitted by the user or system are sent to the OCL engine 311 which evaluates the data 310, as indicated by arrow 6. Finally, the result is obtained from evaluating forms as a report or is directly presented to the user, indicated by arrow 7.

Figure 4:
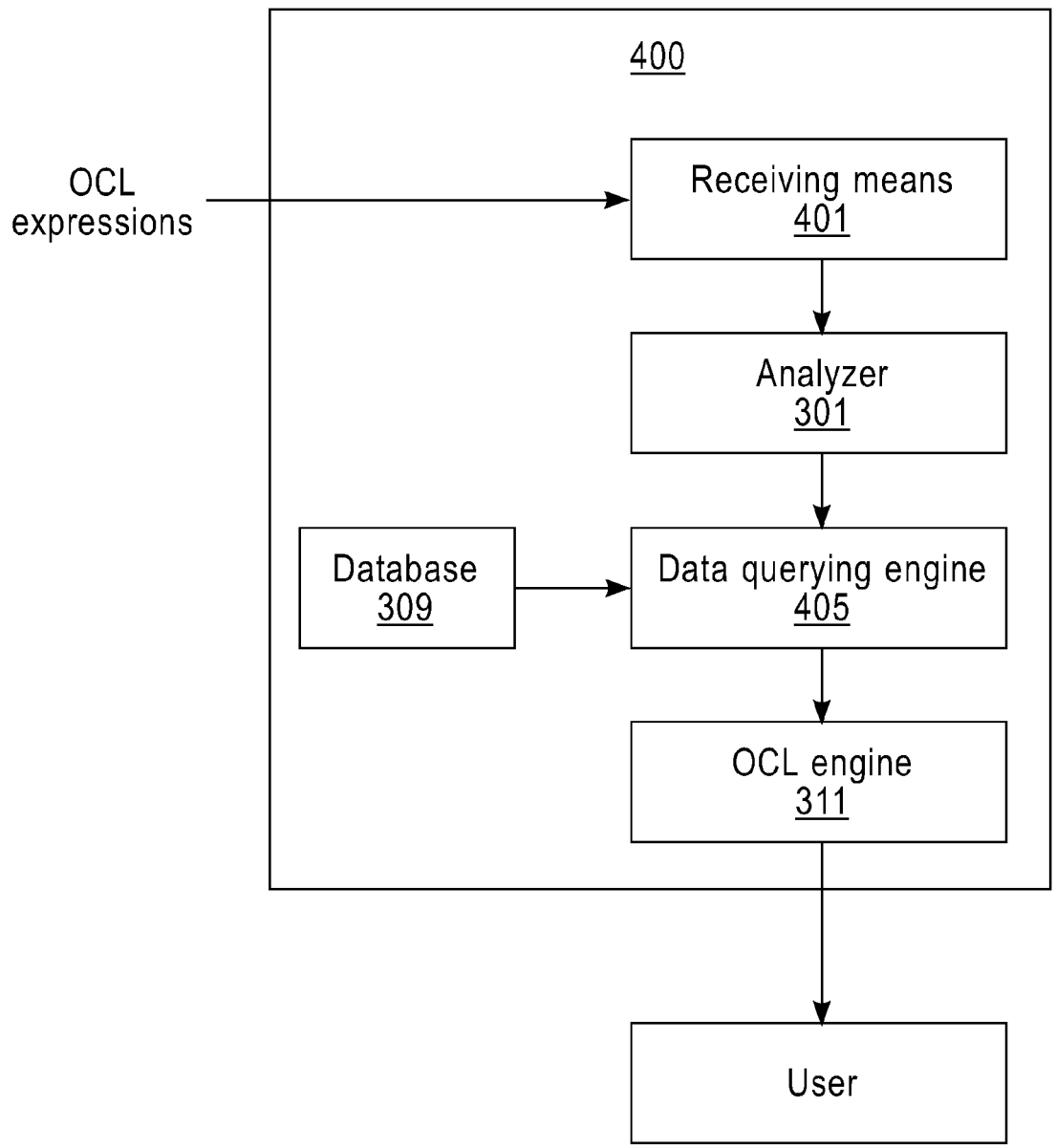
FIG. 4 illustrates a block diagram showing a system for evaluating data according to the present invention.

FIG. 4 illustrates a block diagram showing a system 400 for evaluating data according to the present invention. The system 400 includes a receiving means 401, an analyzer 301, a data querying engine 405, an OCL engine 311, and a database 309. In system 400, the receiving means 401 is configured to receive an Object Constraint Language (OCL) expression-based evaluation request; the analyzer 301 is configured to transform OCL expressions in the evaluation request into query requests; the data querying engine 405 is configured to query relevant data based on the query requests; and the OCL engine 311 is configured to evaluate data obtained from the querying based on the evaluation requests. The method related to the above-mentioned system and means have been described in detail, which will not be further detailed here.

In an embodiment, the analyzer 301 further includes: means for normalizing the OCL expressions; means for rewriting the normalized OCL expressions; and means for transforming the rewritten OCL expressions into query requests based on a transforming rule.

In an embodiment, the OCL expressions conform to BNF form, all conditional expressions of the normalized OCL expressions are conjunctive normal forms, and all operands of the normalized OCL expressions have no iterative definition.

In an embodiment, the means for rewriting the normalized OCL expressions includes means for removing from the OCL expressions those OCL expressions going beyond the capability of data querying engine.

In an embodiment, the OCL expressions going beyond the capability of data querying engine involve arithmetic operations, and the means for removing from the OCL expressions those OCL expressions going beyond the capability of data querying engine includes: means for rewriting an OCL expression into a true value TRUE, if it is a Boolean expression, otherwise, deleting the definitions of the OCL expression and those other expressions that use the definition of the OCL expression, and replacing those deleted expressions with the operands of this OCL expression.

In an embodiment, the transforming rule is a mapping relationship between an OCL language and a query language, and the means for transforming the rewritten at least part of the normalized OCL expressions into query requests based on a transforming rule includes: means for transforming the rewritten at least part of the normalized OCL expressions into query requests based on the mapping relationship.

In an embodiment, there further includes means for introducing a temporary variant such that all operands of the normalized OCL expressions have no iterative definition.

In an embodiment, the analyzer 301 includes means for transforming certain OCL expressions in the evaluation request into data query language-based query requests.

In an embodiment, the data is any type of relational data or Extensible Markup Language (XML) data, or Resource Description Framework (RDF) data.

Further, the method for evaluating data according to the present invention may be implemented through a computer program product, wherein the computer program product embodies computer readable instruction as a software code portion executed when running the computer program product on a computer to implement a simulation method according to the present invention.

The present invention may also be implemented by recording a computer program in a computer-readable recording medium, the computer program including a software code portion executed when running the computer program on a computer to implement a simulation method according to the present invention. In other words, the process of the simulation method according to the present invention may be distributed in a manner of instructions in the computer readable medium or in various other manners, irrespectively of a particular type of a signal bearer medium for actually executing distribution. Examples of a computer-readable medium may comprise media such as EPROM, ROM, magnetic tape, paper, floppy disk, hard disk driver, RAM, and CD-ROM, and transportation-type media such as digital and analog communication links.

Though the present invention has been illustrated and depicted with reference to the preferred embodiments of the present invention, a person of normal skill in the art should understand that various modifications on its form and details are allowed without departing from the spirit and scope of the present invention as limited in the appending claims.

What is claimed is:

1. A method for evaluating data, comprising:
receiving an Object Constraint Language (OCL) expression-based evaluation request;
transforming at least part of the OCL expressions in said OCL expression-based evaluation request into query requests;
querying relevant data based on said query requests; and
evaluating data obtained from said querying based on said evaluation request;
wherein transforming at least part of said OCL expressions in said evaluation request into query requests comprises:
normalizing at least part of said OCL expressions into normalized OCL expressions;
rewriting said normalized OCL expressions; and
transforming said rewritten normalized OCL expressions into query requests based on a transforming rule;
wherein rewriting said normalized OCL expressions comprises removing from said normalized OCL expressions those OCL expressions going beyond the capability of a data querying engine;
wherein said OCL expressions going beyond the capability of said data querying engine involve arithmetic operations, and the removing from said normalized OCL expressions those OCL expressions going beyond the capability of the data querying engine comprises rewriting each normalized OCL expression that is a Boolean expression into a true value TRUE; and
wherein the removing from said normalized OCL expressions those OCL expressions going beyond the capability of the data querying engine comprises:
deleting, in a case that the normalized OCL expression is not a Boolean expression, a definition of said OCL expression and definitions of those other expressions that use said definition of said OCL expression, and replacing those deleted expressions with operands of said OCL expression.

2. The method of claim 1,
wherein said OCL expressions conform to Backus-Naur Form (BNF);
wherein all conditional expressions of said normalized OCL expressions are conjunctive normal forms; and
wherein all operands of said normalized OCL expressions have no iterative definition.

3. The method of claim 1, wherein said transforming rule comprises a mapping relationship between an OCL language element and an element corresponding to a query language.

4. The method of claim 2, further comprising: introducing a temporary variant such that all operands of said normalized OCL expressions have no iterative definition.

5. The method of claim 1, wherein said query request comprises an XQuery-based query request.

6. The method of claim 1, wherein said OCL expressions comprise GELLO, and the data is selected from the group consisting of XML data and relational data.

7. A system for evaluating data, the system comprising:
receiving means comprising hardware configured to receive an Object Constraint Language (OCL) expression-based evaluation request;
an analyzer comprising hardware configured to transform at least part of the OCL expressions in said OCL expression-based evaluation request into query requests;
a data querying engine comprising hardware configured to query relevant data based on said query requests; and
an OCL engine comprising hardware configured to evaluate data obtained from said querying based on said evaluation request;
wherein said analyzer configured to transform at least part of the OCL expressions in said OCL expression-based evaluation request into query requests comprises:
normalizing means to normalize at least part of said OCL expressions into normalized OCL expressions;
rewriting means to rewrite said normalized OCL expressions; and
transforming means to transform said rewritten normalized OCL expressions into query requests based on a transforming rule;
wherein said rewriting means to rewrite said normalized OCL expressions comprises removing means to remove from said normalized OCL expressions those OCL expressions going beyond the capability of a data querying engine;
wherein said OCL expressions going beyond the capability of said data querying engine involve arithmetic operations, and the removing means to remove from said normalized OCL expressions those OCL expressions going beyond the capability of the data querying engine comprises rewriting means to rewrite each normalized OCL expression that is a Boolean expression into a true value TRUE;
wherein the removing means to remove from said normalized OCL expressions those OCL expressions going beyond the capability of the data querying engine comprises:
deleting means to delete, in a case that the normalized OCL expression is not a Boolean expression, a definition of said OCL expression and definitions of those other expressions that use said definition of said OCL expression, and to replace those deleted expressions with operands of said OCL expression.

8. The system of claim 7,
wherein said OCL expressions conform to Backus-Naur Form (BNF);
wherein all conditional expressions of said normalized OCL expressions are conjunctive normal forms; and
wherein all operands of said normalized OCL expressions have no iterative definition.

9. The system of claim 7, wherein said transforming rule comprises a mapping relationship between an OCL language element and an element corresponding to a query language.

10. The system of claim 8, further comprising: a temporary variant such that all operands of said normalized OCL expressions have no iterative definition.

11. The system of claim 7, wherein said query request comprises an XQuery-based query request.

12. The system of claim 7, wherein said OCL expressions comprise GELLO, and the data is selected from the group consisting of XML data and relational data.

13. An article of manufacture comprising a non-transitory computer readable storage medium, the computer readable storage medium having computer readable program code embodied therewith, the computer readable program code, when executing, being configured to perform the steps of:
receiving an Object Constraint Language (OCL) expression-based evaluation request;
transforming at least part of the OCL expressions in said OCL expression-based evaluation request into query requests;
querying relevant data based on said query requests; and
evaluating data obtained from said querying based on said evaluation request;
wherein transforming at least part of said OCL expressions in said evaluation request into query requests comprises:
normalizing at least part of said OCL expressions into normalized OCL expressions;
rewriting said normalized OCL expressions; and
transforming said rewritten normalized OCL expressions into query requests based on a transforming rule;
wherein rewriting said normalized OCL expressions comprises removing from said normalized OCL expressions those OCL expressions going beyond the capability of a data querying engine;
wherein said OCL expressions going beyond the capability of said data querying engine involve arithmetic operations, and the removing from said normalized OCL expressions those OCL expressions going beyond the capability of the data querying engine comprises rewriting each normalized OCL expression that is a Boolean expression into a true value TRUE; and
wherein the removing from said normalized OCL expressions those OCL expressions going beyond the capability of the data querying engine comprises:
deleting, in a case that the normalized OCL expression is not a Boolean expression, a definition of said OCL expression and definitions of those other expressions that use said definition of said OCL expression, and replacing those deleted expressions with operands of said OCL expression.

* * * * *